(12) United States Patent  
Bogenberger et al.

(10) Patent No.: US 8,130,014 B2  
(45) Date of Patent: Mar. 6, 2012

(54) NETWORK AND METHOD FOR SETTING A TIME-BASE OF A NODE IN THE NETWORK

(75) Inventors: Florian Bogenberger, Poing (DE); Mathias Rausch, Markt Schwaben (DE)

(73) Assignee: Freescale Semiconductor, Inc., Austin, TX (US)

( * ) Notice: Subject to any disclaimer, the term of this patent is extended or adjusted under 35 U.S.C. 154(b) by 113 days.

(21) Appl. No.: 12/513,084

(22) PCT Filed: Oct. 31, 2006

(86) PCT No.: PCT/IB2006/054024  
§ 371 (c)(1),  
(2), (4) Date: Apr. 30, 2009

(87) PCT Pub. No.: WO2008/053277  
PCT Pub. Date: May 8, 2008

(65) Prior Publication Data  
US 2010/0073043 A1   Mar. 25, 2010

(51) Int. Cl.  
*H03L 7/00* (2006.01)

(52) U.S. Cl. ........ 327/144; 327/145; 327/291; 327/295; 713/400

(58) Field of Classification Search ............... 327/141, 327/144–163; 331/1 A, 15–17; 375/373–376  
See application file for complete search history.

(56) References Cited

U.S. PATENT DOCUMENTS

| | | | |
|---|---|---|---|
| 5,628,019 A * | 5/1997 | O'Brien | 713/322 |
| 5,694,542 A | 12/1997 | Kopetz | |
| 5,848,028 A | 12/1998 | Burklin | |
| 6,981,088 B2 * | 12/2005 | Holm et al. | 710/306 |
| 7,000,045 B2 * | 2/2006 | Holm et al. | 710/110 |
| 7,305,510 B2 * | 12/2007 | Miller | 710/305 |
| 7,346,723 B2 * | 3/2008 | Kim et al. | 710/305 |
| 2002/0023186 A1 * | 2/2002 | Kim | 710/244 |

(Continued)

FOREIGN PATENT DOCUMENTS

EP   0394051 B1   7/1996

(Continued)

OTHER PUBLICATIONS

Eriksson et al; "A communication protocol for hard and soft real-time systems" IEEE Proceedings of the Eighth Euromicro Workshop; California, USA, Jun. 1996.

(Continued)

*Primary Examiner* — Lincoln Donovan  
*Assistant Examiner* — Brandon S Cole

(57) ABSTRACT

A data communication network may, include a first sub-network and a second sub-network. The first sub-network may include two or more two master clocks, and a synchronization system connected to the master clocks. The synchronization system may, for determine a time-base for the master clocks and control the master clocks based on the determined time-base. The first sub-network may include one or more slave synchronization data source for generating slave clock synchronization data derived from time information of the master clocks. The second sub-network may include one or more slave clocks and a slave clock time-base controller connected to the slave synchronization data source. The time-base controller may receive the slave clock synchronization data and control one or more of the one or more slave clocks in accordance with the slave clock synchronization data.

20 Claims, 4 Drawing Sheets

U.S. PATENT DOCUMENTS

| | | | |
|---|---|---|---|
| 2002/0062414 A1* | 5/2002 | Hofmann et al. | 710/110 |
| 2003/0043790 A1* | 3/2003 | Gutierrez | 370/362 |
| 2005/0055469 A1 | 3/2005 | Scheele | |
| 2005/0259722 A1 | 11/2005 | Vanlonden et al. | |
| 2006/0112205 A1* | 5/2006 | Chang et al. | 710/110 |
| 2007/0174608 A1* | 7/2007 | Balandin et al. | 713/155 |
| 2009/0228732 A1* | 9/2009 | Budde et al. | 713/400 |

FOREIGN PATENT DOCUMENTS

| | | |
|---|---|---|
| EP | 1179920 A2 | 2/2002 |
| EP | 1355458 B1 | 9/2005 |
| EP | 1355460 B1 | 10/2005 |
| EP | 1355459 B1 | 12/2005 |
| EP | 1355461 A2 | 7/2007 |
| EP | 1280024 B1 | 4/2009 |
| WO | 2005119951 A | 12/2005 |
| WO | 2008053378 A1 | 5/2008 |

OTHER PUBLICATIONS

Kopetz et al; "Clock Synchronization in Distributed Real-Time Systems"; IEEE Transactions on Computers, vol. C-36, No. 8, Aug. 1987, pp. 933-940.

Office Action mailed Apr. 4, 2011 in U.S. Appl. No. 12/513,089 (filing date Apr. 30, 2009, and having a PCT Publication No. PCT/IB2007/051823.).

Amendment and Terminal Disclaimer filed Jun. 27, 2011 in U.S. Appl. No. 12/513,089, This Terminal Disclaimer disclaims the term of U.S. Appl. No. 12/513,089 with respect to the present application.

* cited by examiner

US 8,130,014 B2

NETWORK AND METHOD FOR SETTING A TIME-BASE OF A NODE IN THE NETWORK

FIELD OF THE INVENTION

This invention relates to a network, a node for in a network, a time-base controller, a kit of parts, a vehicle, a method for setting a time-base and a computer program product

BACKGROUND OF THE INVENTION

In communication networks, such as computer networks or other data communication networks, accurate timing is often required, for example to facilitate event synchronization and data correlation. Typically, the nodes in the network include an internal clock which provides a local time-base. In theory, if two internal clocks are initially set to a common time-base and their frequency sources are running at exactly the same rate, they would remain synchronized. In practice, however, clocks are set with limited precision, frequency sources run at different rates due to initial manufacturing tolerance, changes in temperature or pressure, and aging. Because of these inherent instabilities, a repeated synchronization may be used to maintain a correspondence between the local time-bases of the nodes in the network.

To set the nodes in the network to a common time-base, so called 'master-slave synchronisation' is known. In a master-slave synchronisation system, the nodes are connected to a common source. The common source provides a common time-base to the nodes, and hence operates as a master, whereas the nodes set their internal time-base to the received common time-base and hence act as slaves. However, a disadvantage of such a synchronisation is that in case the common source fails, the nodes will not be synchronised.

As an alternative to the master-slave synchronisation, so called 'distributed synchronisation' is known, for example from U.S. Pat. No. 5,694,542. In a network with distributed synchronisation, the nodes exchange timing information. Each node determines a time-base from the timing information received from the other nodes and adjusts its internal clock to the determined time-base. However, distributed synchronisation requires complex algorithms to determine the time-base. Furthermore, each node requires a synchronisation unit which can determine the time-base. Accordingly, a disadvantage of distributed synchronisation is that it is complex and requires a large amount of resources.

SUMMARY OF THE INVENTION

The present invention provides a network, a node for in a network, a time-base controller, a kit of parts, a method for controlling a time-base and a computer program product as described in the accompanying claims.

Specific embodiments of the invention are set forth in the dependent claims.

These and other aspects of the invention will be apparent from and elucidated with reference to the examples of embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
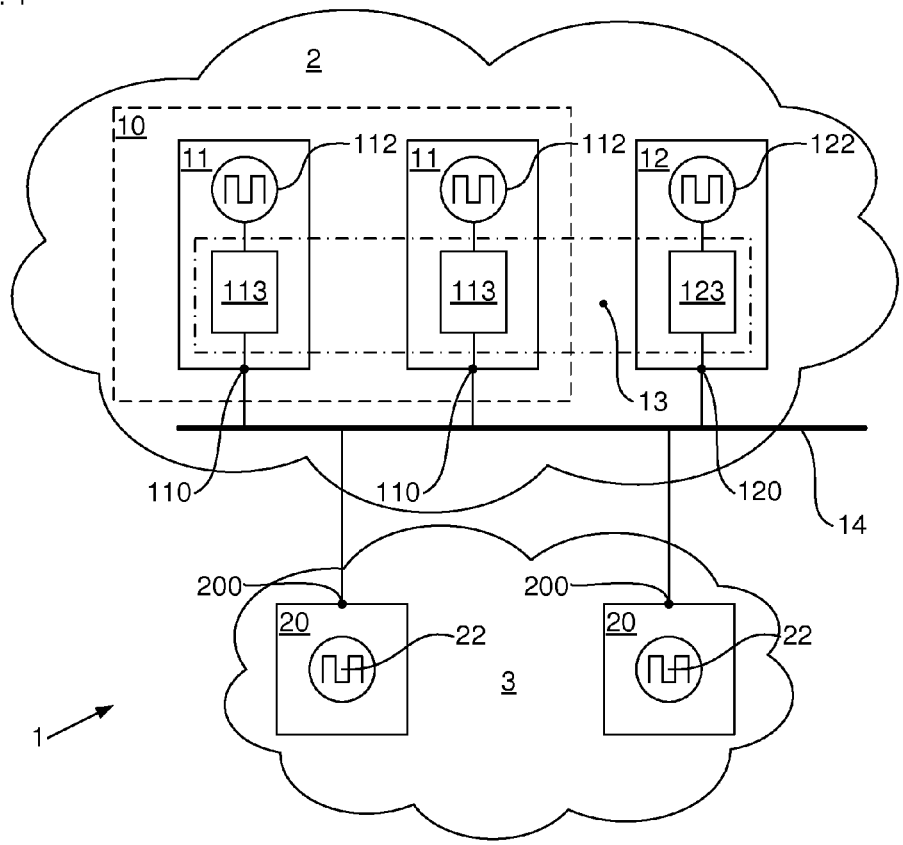
FIG. 1 shows a block diagram of an example of an embodiment of a network.

Referring to FIG. 1, a data communication network 1 is shown which includes a first sub-network 2 and a second sub-network 3. As shown in this example, the first sub-network 2 may for instance include one, two, or more than two first nodes 11. The second network 3 may include one or more second nodes 20. The network 1 may have any suitable topology and the first node(s) 11,12 and the second node(s) 20 may be connected to each other in any suitable manner. For instance, as shown in FIG. 1, the first nodes 11 may be connected to a bus 14 with respective communication ports 110,120 and the second node 20 may, for example, be connected to the bus 14 with a communication port 200. However, the nodes 11,12,20 may be connected to each other via other types of connections.

In the example of FIG. 1, the nodes of the first sub-network 2 and the second sub-network 3 are shown spatially separated from each other. However, the first sub-network 2 and the second sub-network 3 may have a spatial overlap. For example, the first nodes 11,12 and the second nodes 20 may be positioned in an interdigitated arrangement and/or first nodes 11,12 may be present at the same location as second nodes 20. It should be noted that the term 'node' as used in this application at least refers to any arrangement, including one or more elements, in a data communication network which provides network related functions and is administered as an entity in the network. A node may for example include a general purpose computer, a router, a switch, a bridge or other type of node. The first nodes 11,12 may be of a different type than the second nodes 20 and/or the first sub-network 2 may be compliant with one or more standards which are different from one or more of the standards to which the second sub-network 3 complies. For instance, one or more of the first nodes 11,12 may be a node as defined in the FlexRay standard and/or one or more of the second nodes 20 may for example be a node which supports only parts of the FlexRay standard. However, it will be apparent that the invention is not limited thereto and that one or more of the nodes 11,12 in the first sub-network 2 and/or one or more of the nodes 20 in the second sub-network 3 may be other types of physical nodes or logical nodes.

As shown in FIG. 1, the first sub-network 2 may include two or more master clocks 112,122, and a synchronisation system 13 connected to the master clocks 112,122. As shown in the example of FIG. 1, the master clocks 112,122 may be provided in different first nodes 11,12 and the synchronisation system 13 may include synchronisation units 113 in different first nodes 11,12. However, it is also possible that one or more of the nodes 11,12 each include two or more of the master clocks 112,122. The synchronisation system 13 can determine a time-base for said master clocks 112,122 and control the master clocks 112, 122 according to said determined time-base. Thereby, the clocks 112,122 can be synchronised to the determined time-base and hence to each other.

Figure 2:
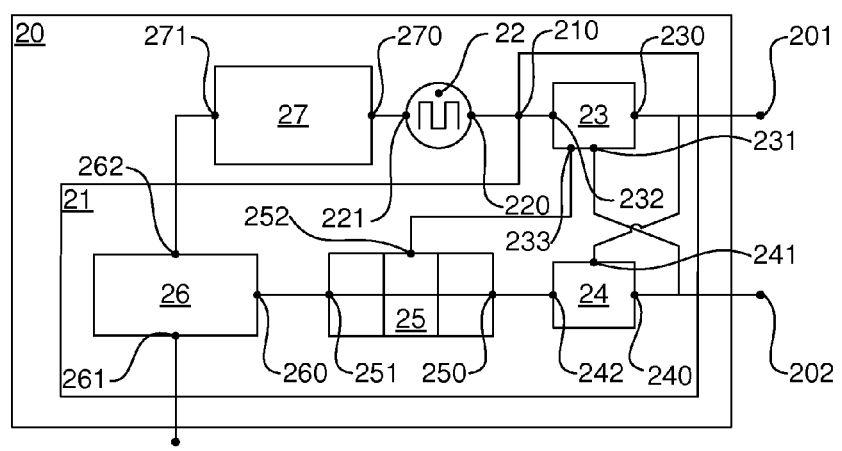
FIG. 2 shows a block diagram of an example of an embodiment of a second node.

As shown in FIG. 1, the second sub-network 3 may be connected to the first sub-network 2 and may include one or more slave clocks 22. In the example of FIG. 1, for instance, two slave clocks 22 are shown, each present in a different second node 20. However, it is also possible that one or more of the second nodes 20 each include two or more slave clocks 22. As shown in FIG. 2 in more detail, the slave clocks 22 may be connected to a slave clock time-base controller 21 which is further connected to a slave synchronisation data source, e.g. to the master nodes 11,12.

The first sub-network 2 may include one or more slave synchronisation sources which can generate slave clock synchronisation data derived from time information of one or more the master clocks 112,122. The slave clock synchronisation source may be implemented in any manner suitable for the specific implementation. For instance in the example of FIG. 1, as explained below in more detail, each of the first nodes 11,12 in the first sub-network 2 may transmit data representing information about the time-base, such as the phase and frequency thereof, of one or more of the master clocks 112,122 used by the respective first node 11,12. The data may include the current time indicated by the local clock(s) 112 of the respective first node 11. However, the first nodes 11,12 may transmit the information in any suitable manner. Accordingly, the first nodes 11,12 operate as slave synchronisation data sources.

Figure 8:
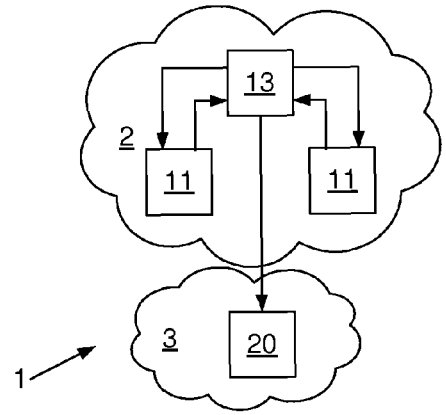

However, the slave clock synchronisation source may also be implemented in a different manner. For instance, the first sub-network 2 may, for example, include a slave clock synchronisation source which is connected to a plurality of master clocks 112,122. As for example shown in FIG. 8, the slave clock synchronisation source may be implemented on a synchronization system 13 separate from, but connected to, the node 11,12 in which the respective master clock 112,122 is provided. The separate node may for example, as indicated in FIG. 8 with the arrows pointing towards the node 13, receive information about the time-base of the master clocks 122,122 (such as a common time-base determined by a synchronisation system) and determine from the received information a suitable time-base for the slave clocks 22. The slave clock synchronisation source may be connected to one or more of the slave clocks 22 and transmit data which includes the determined time-base to the slave clocks 22, as indicated in FIG. 8 with the arrows pointing towards the node 20.

As explained below in more detail, the second node(s) 20 may for instance include(s) a slave clock time-base controller 21. The slave clock time-base controller 21 can receive the slave clock synchronisation data and control one or more of the one or more slave clocks 22 in accordance with the slave clock synchronisation data. Thereby, the time-base controller 21 does not need to have a synchronisation system to determine the time-base suitable to synchronise the second clock 22, and accordingly the time-base controller 21 may be of a relatively simple design. Furthermore, the time-base of the second clock 22 may be controlled in a reliable manner.

The slave clock time-base controller 21 may be implemented in any suitable manner. For instance, the first nodes 11,12 may, for example, transmit a broadcast message to the nodes 11,12,20 in the network 1. The broadcast message may for example include the current time indicated by the respective master clock(s) 112 or other parameter suitable to control the time-base. The slave clock controller 21 may be connected to the first nodes 11,12 in such a manner that the slave clock controller 21 can receive the broadcast messages and process the messages originating from one or more of the first nodes 11,12. The slave clock controller 21 may set the time-base of the slave clock 22 in accordance with the time-base indicated by the processed messages. The first nodes 11,12 may also, or alternatively, transmit the message in another manner and for example transmit the message only to a selected number of nodes 11,12 and 20 in the network 1, e.g. by transmitting the message to a specified address in the network 1.

The synchronisation system 13 may be implemented in any manner suitable for the specific implementation. As for example shown in FIGS. 6-8, the synchronisation system 13 may be implemented as separate from but, directly or indirectly, connected to the first nodes 11,12. For example, the synchronisation system 13 may determine the time-base for the master clocks 112,122 without using information about the current time-base of the master clocks 112,122 and transmit, as indicated with the arrows in FIG. 7, data representing the determined time-base to the nodes 11 in which the respective clock is present.

Figure 5:
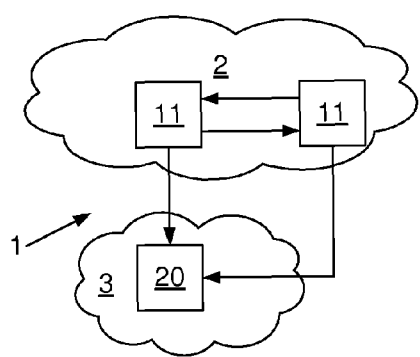
FIGS. 5-8 show examples of networks of first and second nodes.
Figure 6:
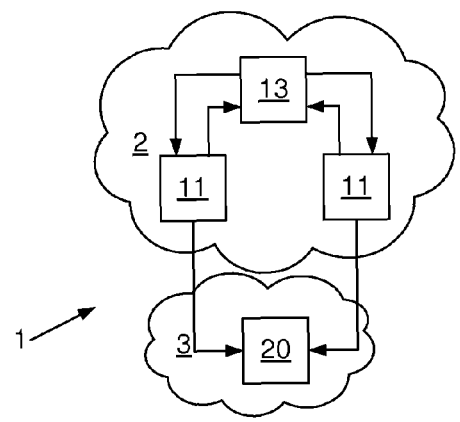
Figure 7:
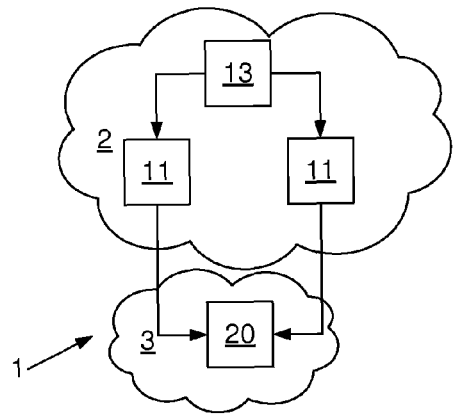

As shown in FIGS. 1,5,6 and 8, it is also possible that the synchronisation system 13 does use information about the current time-base of the master clocks 112,122 to determine the time-base for the master clocks 112,122. For example, as indicated in FIGS. 6 and 8 with the double-arrows, the synchronisation system 13 may receive data about the current time-base from the respective nodes 11 and transmit data representing the determined time-base to the nodes 11 in which the respective master clock 112,122 is present. The synchronisation system 13 may for instance determine a common time-base from information about the master clocks 112. The synchronisation system 13 may be connected to the master clocks 112 and receive clock data which represents the information about the master clocks 112. As shown in FIG. 1, the network 1 may for example include two or more first nodes 11,12 connected to the synchronisation system 13 and which are able to transmit clock data to the synchronisation system 13. The synchronisation system 13 may determine the common time-base from the clock data received from the respective first nodes 11,12. The synchronisation system 13 may further control the master clocks 112,122 based on the determined common time-base. For example, the master clocks 112,122 may be synchronised by the synchronisation system 13 according to the determined common time-base. Thereby, a current time-base of a master clock 112 may be deemed to be the common time-base, because the master clock 112 is synchronized.

The synchronisation system 13 may be arranged to determine the common time-base without using the time-base of one or more of the slave clocks 22. For instance, in the example of FIG. 1, the second clocks 22 may be connected to the bus 14, via the time-base controller 21, only to receive information via the network 1 and be inhibited to transmit information to the synchronisation system. Accordingly, the synchronisation system 13 is arranged to determine the common time-base without, at least partially, using the time-base of one or more of the slave clocks 22. Thereby, the slave clocks 22 can be prevented from affecting the common time-base and accordingly from affecting the synchronisation of the first nodes 11,12. However, the synchronisation system 13 may be inhibited from using a time-base of the slave clock 22 of one, or more than one, or all the second nodes 20 to determine said common time-base in any suitable manner. For instance, the synchronisation system 13 may be configured to use time-base data from a set of selected nodes only, which set excludes the second nodes 20 present in the network 1. The inhibited slave clocks 22 may for be present in second node(s) 20 which are of a less reliable type or be less critical to the network 1. For instance, in case the slave clocks 22 are less accurate than the accuracy of the master clocks 112,122, the respective slave clocks 22 may be inhibited. Thereby, the accuracy of the common time-base may be increased. Also, in case the second nodes 20 have relatively high risk of failure, the slave clocks 22 in these second nodes may be inhibited. Thereby, the chance that a break down of a node affects the synchronisation may be reduced.

As shown in the example of FIGS. 1 and 5, the synchronisation system 13 may, for example, include a separate synchronisation unit 113,123 connected to a respective master clock 112,122. The synchronisation unit 113,123 may for example be present in the same first node 11,12 as the respective master clock 112,122. Each of the first nodes 11,12 may be able to transmit clock data to one or more of the other first nodes 11,12. The synchronisation unit 113,123 respective in the respective receiving first node 11,12 may determine a common time-base from the clock data received from one or more of the other first nodes 11,12. The master clocks 112, 122 of the first nodes 11,12 in the network 1 may be synchronised by the respective synchronisation unit 113 according to the determined common time-base.

The first nodes 11,12 may for example transmit clock data representing a current state of the master clock(s) 112,122 used by the respective node to other first nodes 11,12. The first nodes 11,12 may further send the clock data to the second nodes 20. The first nodes 11,12 may, for example, transmit a broadcast message to the nodes 11,12,20 in the network 1. The broadcast message may includes the current time indicated by the local clock(s) 112 of the respective first node 11. The synchronisation unit 113,123 in the respective receiving first node 11,12 may determine a common time-base from the received clock data. The synchronisation unit 113,123 in the respective receiving first node 11,12 may for example determine an average of the received current time and use the average as the common time. However, the synchronisation unit 113,123 may determine a common time in any manner suitable for the specific implementation. For instance, in case the first nodes 11,12 are compliant or compatible with the FlexRay standard, the synchronisation unit 113,123 may, for example, determine a common time in a manner compliant or compatible with the FlexRay standard or in any other suitable manner.

The master clocks 112,122 in the network 1 may be synchronised by the respective synchronisation unit 113 according to the determined common time-base. Thus, the master clock 112 is, within a margin or error, similar to the common time-base and accordingly, the current time indicated by a, synchronised, master clock 112 may be deemed to be the common time-base. The master clocks 112,122 may be synchronised by the respective synchronisation unit 113,123 to the common time-base in any manner suitable for the specific implementation. For example, one or more other parameters of the master clock 112,122, such as frequency and/or phase, may simply be set by the respective synchronisation unit 113,123 to a value corresponding to the common-time base. For instance, the time of the master clock 112,122 may be set to a time-stamp included in a message received at the respective node 11,12. Also, for instance, the synchronisation of the master clocks 112,122 of the respective first node 11,12 may include comparing the state of the master clock 112,122 with the determined common time-base, and adjusting one or more parameters of the master clock 112,122 when a predetermined adjustment criterion is satisfied. For example, the time of the master clock 112,122 may be adjusted when the difference between the state of the respective master clock 112, 122 and the determined common time-base exceeds a predetermined adjustment criterion.

The slave clock synchronisation data may for example represent the time-base of the selected master clocks 112 of the first nodes 11. The master clocks 112 of the selected first nodes 11 may, as described above, be synchronised using the determined common time-base. Accordingly, the slave clock synchronisation data may be used to synchronise the second node 20 to the determined common time-base. For example, the synchronisation unit 113 may be configured to periodically transmit data representing the local time-base of the master clock 112,122. The slave clock synchronisation data and/or the master clock synchronisation data may for example be transmitted as a message which includes a time-stamp corresponding to a determined common time, and the slave clocks 22 resp. the master clocks 112,122 may be set to the time included in the message. The second node(s) 20 may control the slave clock 22 based on the received data. The data may for example be broadcast in the network 1 by nodes which are synchronized by the synchronisation system 13, and the second node 20 may be configured to synchronise its clock 22 using data received from selected first nodes 11 only. However, the time-base may also be synchronised in another manner.

The slave clock time-base controller 21 may receive the slave clock synchronisation data in any manner suitable for the specific implementation. For example, the second nodes 20 may receive slave clock synchronisation data from only a part of the master clocks 112,122, as indicated in the example of FIG. 1 with the dashed area 10. For instance, as shown in FIG. 1, the first sub-network 2 may for example include three or more master clocks 112,122 and the selection may include substantially less master clocks 112,122 than present in the first sub-network 2. For example, the selection may include one or two master clocks 112.

The second node(s) 20 may for example be able to process slave clock synchronisation data from a selected part of the first nodes 11,12, e.g. one or two selected first nodes 11, or other slave clock synchronisation data sources, and synchronise one or more parameters of the respective slave clock 22 using the received slave clock synchronisation data.

The second sub-network 2 may include two or more second nodes 20. In such case, the second nodes 20 may have the same selection of master clocks 112. However, it is also possible that the second nodes 20 each have a different selection of master clocks 112. Thereby reliability of the second sub-network 3 may be improved.

The second nodes 20 may for example include a selection unit which selects master clocks 112,122, or other slave clock synchronisation data sources, based on one or more suitable selection criteria. Thereby, the reliability may be improved since the second nodes 20 can select a suitable selected master clocks 112 depending on the specific configuration of the network 1 or conditions in the network 1. The selection unit may for example select the nodes 11 corresponding to a selected master clock 112 during initialization and maintain the selection of the selected master clocks 112 during the entire operation. For example, the unit may select a number of first nodes 11 from which the second synchronisation data is received prior to the synchronisation. The selection unit may also dynamically select the nodes 11 during operation of the second node 20.

Alternatively, the selection of the selected master clocks 112,122 may, for example, be preconfigured prior to the operation of the respective second node 20. Thereby, the construction of the second nodes 20 may be of a relatively simple design. The second node 20 may for instance include a writable or non-writable memory (not shown in FIG. 1) in which an identification of the first nodes 11 with the selected master clocks 112 is stored. The identification may for example be stored during manufacturing or in an adaptive mode configuring the node after manufacturing of the respective second node. Also, the memory may for example be a writable memory which can be written before the second node 20 is connected to the network 1. Thereby, the second node 20 may be flexible, since the memory can be configured to match the specific type of network 1, while the design of the second node 20 may remain relatively simple.

FIG. 2 schematically shows an example of a second node 20 suitable to be used in the example of a network 1 shown in FIG. 1. As shown in FIG. 2, the second node 20 may include a time-base controller 21 and an slave clock 22. In the example of FIG. 2, the time-base controller 21 is connected to second node inputs 201,202. Each of the second node inputs 201,202 is connected to a respective one of the selected first nodes 11. (In the following, the term 'first node' is used for sake of clarity and briefness. However, it will be apparent that this implies a connection to a slave clock synchronisation source and/or to a (selected) master clock.) The time-base controller 21 can receive the slave clock synchronisation via the inputs 201,202. The time-base controller 21 may be compare slave clock synchronisation signals derived from one or two selected master clocks 112 with each other.

The time-base controller 21 may control the slave clock 22 based on the received slave clock synchronisation data. For instance, in the example of FIG. 2, the time-base controller 21 is connected with a controller output 210 to a control input 220 of the slave clock 22. The time-base controller 21 may for instance, as shown in FIG. 2, include a clock controller 23 which may be connected with a controller input 230 to a second node input 201 (which in turn may be connected to a selected first node 11). Another controller input 231 may be connected to another second node input 202. A clock controller output 232 is connected to the control input 220 of the slave clock 22. The clock controller 23 may receive, via the controller input 230, the slave clock synchronisation data from the selected first node 11. The clock controller 23 may compare the time-state of the slave clock 22 with the received slave clock synchronisation data. Based on the comparison, the clock controller 23 may adjust one or more parameters of the slave clock 22, via the controller output 232. For instance, the clock controller 23 may set the time and/or clock rate of the slave clock 22 to a time-stamp included in a message received at the respective second node input 201,202. The time stamp may for example include values for the frequency (or rate) and/or the phase (or offset) of a selected master clock 112 and the frequency (or rate) and/or the phase (or offset) of the slave clock 22 may be set to the values in the time-stamp. It is also possible that the clock controller 23 performs a correction to the time-stamp. The correction may for example take into account the delay between generation of the values and reception by the clock controller 23.

The time-base controller 21 may for example be arranged to determine a reliability level of the time-base of the second node 20. In the example of FIG. 2, for instance, the time-base controller 21 includes a state controller 24 which controls a state of the second node 20 by determining the reliability level. The state controller 24 may, as shown in FIG. 2, be connected with a state controller input 240 to a second node input 202, and be connected with another state controller input 241 to another, first node input 201. The state controller 24 may compare the signals received at the respective state controller inputs 240,241 with a predetermined criterion and, based on the comparison, determine a reliability level of the time-base. The state controller 24 may, as shown in the example of FIG. 2, be connected with a state controller input/output port (I/O) 242 to an I/O 250 of a memory 25. The state controller 24 may for example store data representing the determined reliability level in the memory 25 via the state controller I/O 242. The state controller 24 may for example include a memory (not shown in FIG. 2) in which a set of criteria is stored, and compare the received slave clock synchronisation signals with a selected criterion depending on a current reliability level.

Figure 4:
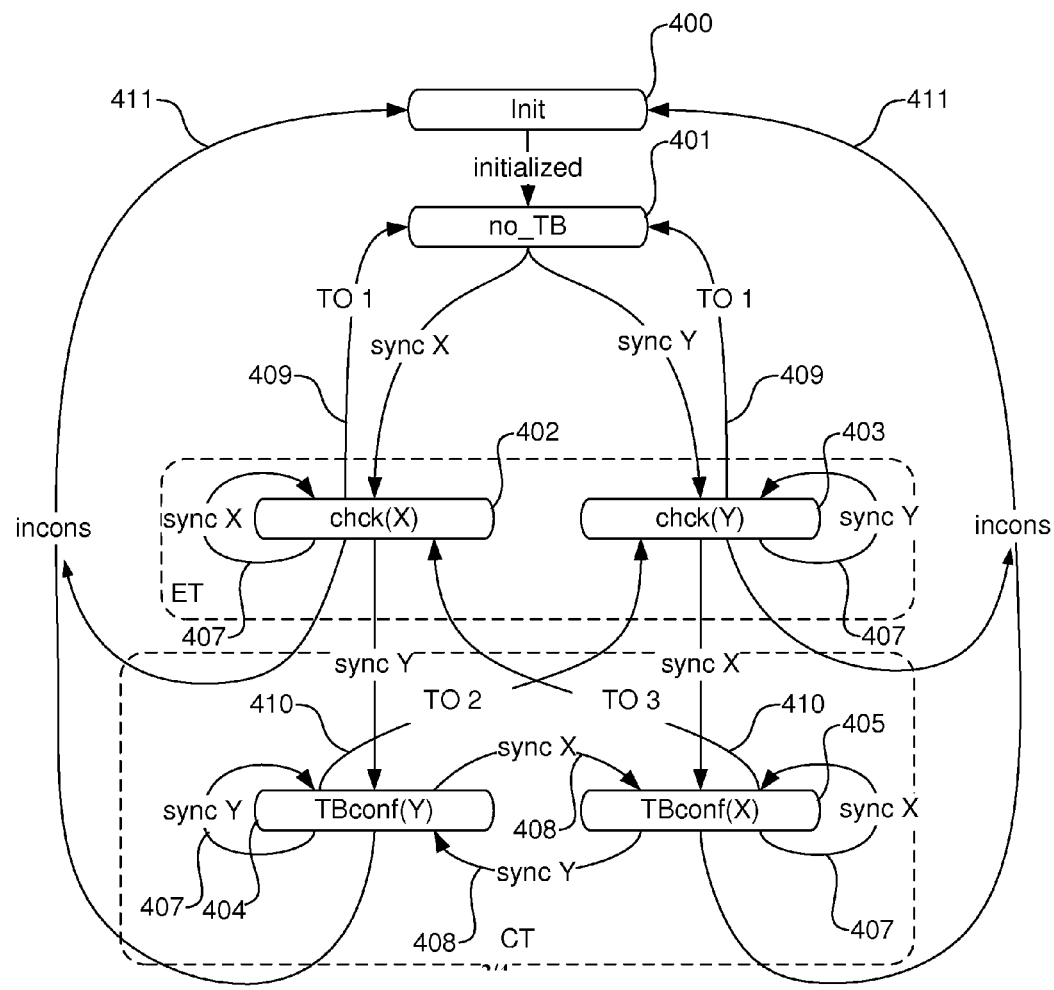
FIG. 4 schematically a flow-chart of an example of a method for synchronising a second node.

FIG. 4 schematically shows an example of a method which may be performed. As shown in FIG. 4, after an initialisation step 400, the time-base controller 21 may set the second node 20 in a no time-base state (no_TB) 401, which indicates that the state of the slave clock 22 is not based on a common time-base and, accordingly, may be unreliable. The state controller 24 may then store data indicating the no time-base state in the memory 25. In the no time-base state 401, for example, the state controller 24 may periodically check whether a synchronisation signal is presented at one of the state controller inputs 240,241. The state controller 24 may for example perform an operation which may be described by the pseudo-code:

```
if (SYNC(X)=false AND SYNC(Y)=false)
    then state= no_TB.
```

In this pseudo-code, SYNC(X) and SYNC(Y) respectively represent a signal SYNC received at a state controller input 240,241 from a selected first node X or another selected first node Y.

The state controller 24 may for example determine that a signal is received at the respective input and compare the received signal with other criteria to determine whether or not the received signal is a slave clock synchronisation signal, in check (chk) steps 402 or 403. The state controller 24 may for example compare the received signal with one or more syntax check criteria, suitable to check whether the signal complies with syntax rules for a slave clock synchronisation signal. For example, depending on the specific type of network 1, the slave clock synchronization signal may be required to have a certain length, to include a certain type data at a predefined position in the signal or other syntax requirement. (e.g. to have an identifier of the first node from which the signal originates between data positions N to N+Q, to include a time-stamp at data positions P to P+M, etc.).

Also, the state controller 24 may compare the content of the signal with one or more criteria to determine whether the received signal is a suitable slave clock synchronisation signal. The state controller 24 may for example compare a source identifier in the received signal with data identifying the selected first nodes. When the source identifier is not similar to the identifier of a selected first node 11, the state controller 24 may, for example, label SYNC(X) and SYNC(Y) with a 'false' value. When the source identifier is similar to the identifier of a selected first node 11, the state controller 24 may, for example, label the respective slave clock synchronisation signal, e.g. SYNC(X) or SYNC(Y), with a 'true' value.

When a slave synchronisation signal is received from a first node 11 which complies with the checks performed by the state controller 24, the state controller 24 may determine that the second node 20 has a time-base and change the state of the reliability level in the memory 25 from no-time-base to established time-base (ET). The state controller 24 may then store data indicating the established time-base state in the memory 25. The established time-base indicates that the slave clock 22 is set to the common time-base, and may be reliable but is only supported by a single first node 11 and hence depends on the accuracy of the single first node 11. The state controller 24 may then for example perform an operation which may be described by the pseudo-code:

```
if ((SYNC(X)=true or SYNC(Y)=true) AND state=no_TB))
then
    state= ET
else
    state=no_TB
```

When a slave synchronisation signal is received from a first node 11 which complies with the checks performed by the state controller 24, the slave clock 122 of the second node 20 may be adjusted in accordance with the received slave clock synchronisation signal (e.g. in accordance with SYNC(X) or SYNC(Y) in the example of FIG. 4). For example, the master clocks 112,122 of the first nodes 1,12 may be set to the determined common time-base. As explained above, the first nodes 11,12 may transmit a signal which represents a time of the master clock 112,122 of the respective first node 11,12 (which is controlled based on the common time-base and hence represents the common time-base). The clock controller 23 may then set the state of the slave clock 22 to the common time-base represented by the current time of the master clock 112 of the first node 11. The state controller 24 may for example perform an operation which may be described by the pseudo-code:

```
if SYNC(X)=true
    then
        time-base=TB(X)
    else
    {
        if SYNC(Y)=true
            then
                time-base=TB(Y)
    }
```

In which pseudo-code TB(A) represents the time-base provided by a slave clock synchronisation signal SYNC(A) received from a selected first node A.

In the established time state ET, the state controller 24 may check whether a slave clock synchronisation signal from another selected first node 11 is received. When a signal from another selected first node 11 is received by the second node 20, the state controller 24 may determine whether or not the received slave clock synchronisation signals correspond to a sufficient degree. E.g. supposing that first a slave clock synchronisation signal SYNC(X) is received, the state controller 24 may check whether a slave clock synchronisation signal SYNC(Y) is received which corresponds sufficiently to the other signal SYNC(X), in confirmation steps 404 resp. 405. The time-base controller 21 may for example be arranged to compare the slave clock synchronisation signal SYNC(X) with the other slave clock synchronisation signal SYNC(Y). Thereby, the time-base controller 21 can determine differences between SYNC(X) and SYNC(Y) and check the difference against a suitable criterion.

For example, the state controller 24 may compare the information in the slave clock synchronisation signals SYNC(X) and SYNC(Y) to determine a difference. The state controller 24 may for example compare the time-base information included in the received slave clock synchronisation signals with each other to determine whether or not the received slave clock synchronisation signals correspond to a sufficient degree. In case a difference in the time-base of time is found which exceeds an timing error threshold, the state controller 24 may determine that the received signals are not consistent and maintain the current state, e.g. the established time-base state ET. Also, the period of time between receiving consecutive signals SYNC(X) and the period of time between receiving consecutive signals SYNC(Y) may be compared. In case a difference in the period of time is found which exceed a certain threshold, the state controller 24 may determine that the received signals are not consistent and maintain the current state, e.g. the established time-base state ET.

In case the state controller 24 determines that the slave clock synchronisation signals SYNC(X) and SYNC(Y) correspond sufficiently, the state controller may set the state value in the memory 25 to confirmed time-base (CT). The state controller 24 may then store data indicating the CT state in the memory 25. The state controller 24 may for example perform in confirmation steps 404,405 an operation which may be described by the pseudo-code:

```
if ((SYNC(X)=true AND SYNC(Y)=true) AND state=ET))
    then
    {
        if ((SYNC(X) is consistent with SYNC(Y)) AND state=ET))
            then
                state= CT
    }
    else state=init
```

One or more of the first nodes 11 may be arranged to repeatedly transmit the slave clock synchronisation data. As shown in FIG. 4 with arrows 407, the time-base controller 21 may periodically check whether the conditions for the current reliability level are fulfilled and maintain the current reliability level when the conditions comply with the requirements set for the specific reliability level. For example, when the conditions for the reliability level 'established' are fulfilled a predetermined number of times, e.g. two or more times, the state controller 24 may set the reliability level to consistent, indicating that the time-base of the slave clock has been set to the common time-base repeatedly and is hence relatively reliable but originates from a single first node 11. The time-base controller 21 may be arranged to change the reliability level from a current level to a lower level when a predetermined period of time has lapsed after a last time the time-base controller 21 received the slave clock synchronisation data from the respective first node. For example, as indicated with arrow 409 in FIG. 4, if in the established time-base state ET the slave clock 22 has been set corresponding to the information in a slave clock synchronisation signal sync(N) received from a selected first node N, the state controller 24 may for example perform an operation which may be described by the pseudo-code:

```
if (SYNC(N)=false)
    then:
    {
        start timer
        if (timer> time_out )
            then: current state= no_TB
            else: current state=ET
    }
    else: current state=ET
```

As indicated with arrows 410 in FIG. 4, the state controller 24 may for example perform in the confirmed time-base state CT an operation which may be described by the pseudo-code:

```
if (SYNC(X)=false OR SYNC(Y)=false)
    then:
        {
        start timer
        if (timer> time_out )
            then: current state= ET
            else: current state=CT
        }
    else: current state=CT
```

Also, the time-base controller 21 may be arranged to change the reliability level from a current level to a lower level when the reliability level remains unchanged for a predetermined period and the conditions for the current state remain to be fulfilled. For instance, when the current reliability level is not the highest reliability level, the current reliability level may be lowered when a predetermined amount of time has expired after the time at which the current reliability level has been set. E.g. when in the ET state a respective signal, e.g. SYNC(X) maintains being be received, but not the other signal, e.g. SYNC(Y), after a predetermine time (or number of repetitions of check steps 402,403, following arrows 407 in FIG. 4) the state may be changed to no_TB, following the time-out 1 (TO1) arrow 409 in FIG. 4.

The time-base controller 21 may be arranged to control an operational mode of the one or more second node depending on the determined reliability level. For example, in the established time-base state ET, the slave clock 22 may be synchronized to one of the first nodes 11. However, since only one first node has been used to synchronize the slave clock 22, the reliability of the synchronisation may be rather low. Accordingly, depending on the desired accuracy of the second node 22, transmission and/or reception of non-synchronisation signals (e.g. for example the transmission of sensor data obtained by a sensor in the second node 20) may be inhibited.

As shown in FIG. 2, the time-base controller 21 may for example include a mode controller 26 which can control the operational mode of other components in the second node 20, such as of one or more processors 27. In the example of FIG. 2, a processor 27 is connected with a clock input 270 to the slave clock 22. A mode control input 271 of the processor 27 is connected to a control output 262 of the mode controller 26. An input 260 of the mode controller 26 is connected to a port 251 of the memory 25.

Table 1 shows an example of the mode of the second node as a function of the reliability level stored in the memory 25. In table 1, the symbol "+" indicates that the second node 20 may transmit data whereas the symbol "−" indicates that transmission of data is not allowed.

TABLE 1

| reliability | availability | | |
|---|---|---|---|
| | high | normal | secure |
| confirmed | + | + | + |
| consistent | + | + | − |
| established | + | − | − |
| n/a | − | − | − |

As shown in table 1, the mode controller 26 may for example be configured depending on the required availability of the second node 20 (e.g. high, normal or secure). When set to high, the second node 20 may transmit data already when the reliability level is set to established. When set to normal, the second node 20 may transmit data only when the reliability level is set to consistent or higher. When set to secure, the second node 20 may transmit data only when the reliability level of the time-base is set to confirmed.

Figure 3:
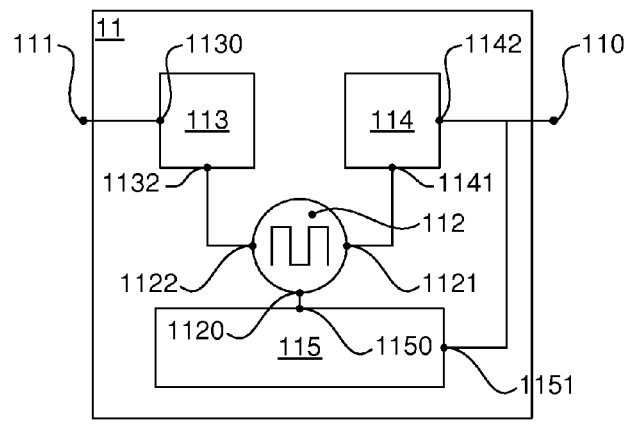
FIG. 3 shows a block diagram of an example of an embodiment of a first node.

FIG. 3 schematically shows an example of a first node 11 suitable to be used in the example of a network 1 shown in FIG. 1. As shown in FIG. 3, the first node 11 may include an master clock 112 which can generate a clock signal. The first node 11 may further include a processor 115 may be connected with a clock input 1150 to an output 1120 of the master clock 112. At the output 1120 of the master clock 112, a clock signal may be outputted. The outputted clock signal can be used by the processor 115, for example to schedule or time the processing of data. The processor 115 may have a processor input/output port (I/O) 1151 which is connected to the communication port 110. At the processor I/O 1151, the processor 115 may, for example, output data to other nodes or receive data from other nodes, via the communication port 110 and the bus 14 for example.

As shown in FIG. 3, the first node 11 may include a synchronisation unit 113 connectable to one or more other first nodes 11,12 and connected to the master clock 112. The synchronisation unit 113 may receive timing information about the timing of one or more of the other first nodes 11,12 and determine a common time-base using the received timing information. The master clock 112 may subsequently be adjusted to the common time-base. For example, the synchronisation unit 113 may adjust the master clock 112 when a difference between the timing of the master clock 112 and the common time-base exceeds a threshold or set the state of the master clock 112 to the determined common time-base. In the example of FIG. 3, the synchronisation unit 113 is connected with a controller input 1130 to the synchronisation port 111. The synchronisation port 111 may be connected to the other first nodes 11,12. e.g. via the bus 14. In this example a separate synchronisation port 111 is shown for illustrative purposes. However, it will be apparent that the synchronisation port 111 and the communication port 110 may be the same. The synchronisation unit 113 can receive the timing information from other first nodes 11,12 the controller input 1131. The synchronisation unit 113 is connected with a controller output 1132 to a control input 1122 of the master clock 112. The synchronisation unit 113 can adjust the master clock 112 based on the determined common time-base, by transmitting the clock control signal to the control input 1122.

The first node 11 may include, as shown in FIG. 3, a slave synchronisation unit 114. The slave synchronisation unit 114 can generate a slave clock synchronisation signal based on the common time-base. In the example of FIG. 3, for instance, the slave synchronisation unit 114 is connected with an input 1141 to a clock output 1121 of the master clock 112. The slave synchronisation unit 114 is connected with an output 1142 to the communication port 110 of the first node 11. Timing information from the master clock contains information about the common-time base, since the master clock 112 is synchronised to the common time-base. The slave synchronisation unit 114 can receive timing information from the master clock 112, and hence information about the common time-base, to generate the slave synchronisation signal. For example, the slave synchronisation unit 114 may transmit to at least the second nodes 20 a slave clock synchronisation signal which includes the time of the master clock 112.

In this example a slave synchronisation unit 114 is shown for illustrative purposes. However, it will be apparent that the node 11 may include a unit which simultaneously synchronises master clock 112 and outputs a synchronisation signal to the second nodes 20, for example by simultaneously transmitting a determined common time base to the master clock 112 and the slave clocks 22.

The network 1 may be any type of network suitable for the specific implementation. For example, the network may be used to control and/or monitor an aspect of the operation of one or more apparatuses. For example, one or more of the nodes in the network 1 may be control nodes that control or monitor aspects of the operation of an apparatus, such as a vehicle, a robot or other type of apparatus. For instance, the first nodes 11 may control or monitor aspects which require a high reliability, and the second nodes 20 may control or monitor aspects which require a lower reliability. The first nodes 11 may for example required for operation of the apparatus and the second nodes may control aspects that, when not controlled, will not result in a failure of the overall apparatus. For example, the network 1 may be part of a braking system and the first node may e.g. control the breaking pedal whereas the second nodes may each control the brake on a wheel. Accordingly, if one of these second nodes fails the whole system is still working whereas if the first node is not working the whole breaking system will not function at all. The first nodes 11 may for example be controlling an airbag system, a braking system, a seat belt or be part of an air traffic control system, a fly-by-wire system, a life support system or form a central control node in a control system. The second nodes may for example be not-safety critical and for example control the opening of locks or monitor the pressure in a tyre.

Figure 9:
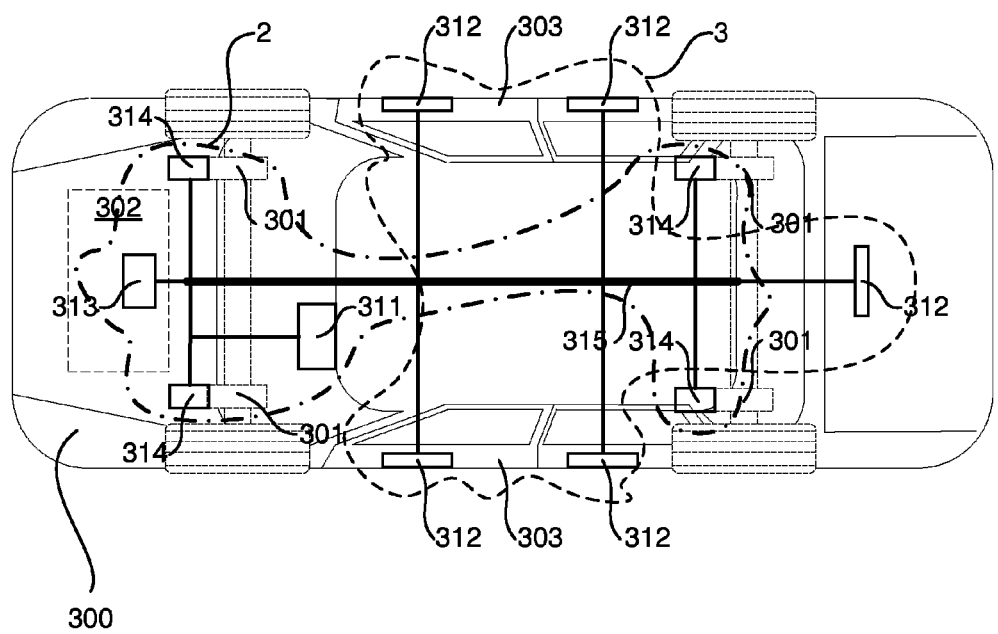
FIG. 9 shows a schematic top-view of an example of a vehicle provided with an example of a network.

For instance, FIG. 9 shows an example of vehicle 300 provided with safety-critical nodes. The example shown in FIG. 9 includes an engine 302. An engine control node 313 is present which can control and monitor the engine 302. The vehicle further has break control nodes 314 which can control and monitor the breaks 301. The vehicle 300 further has door lock control nodes 312 which can actuate the locking and unlocking of doors 303 of the vehicle 300. The nodes 312-314 are connected to a control node 311 via a connection 315. At the human control node 311, data can be inputted by a driver of the vehicle, for example by pressing with his or hers foot on a pedal, to control operation of second nodes 20. It will be apparent that when the human control node 311, e.g. the brake pedal, fails this may lead to in death or serious injury to people and/or loss or severe damage to the vehicle, whereas if the door lock control nodes 312 or the engine control node 313 does not function, the consequences are less serious. Accordingly, the human control node 311 may be implemented as a first node and the door lock control nodes 312 as second nodes.

The invention may be implemented as a kit of parts. The kit may be provided as a set of separate components which can be connected to each other to assemble, for example a time-base controller or to assemble a first node or a second node. The invention may also be implemented in a computer program for running on a computer system, at least may include code portions for performing steps of a method according to the invention when run on a programmable apparatus, such as a computer system or enabling a programmable apparatus to perform functions of a device or system according to the invention. Such a computer program may be provided on a data carrier, such as a CD-ROM or diskette, stored with data loadable in a memory of a computer system, the data representing the computer program. The data carrier may further be a data connection, such as a cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the network may be used to control an apparatus, and for example include an industrial control system of form part of a manufacturing system. Also, the network may be compliant or compatible with one or more standards in the group consisting of: FlexRay, Time Triggered Protocol/Class C (TTP/C), time-triggered communication on CAN (Controller Area Network) protocol (TTCAN).

Furthermore, the connections may be an type of connection suitable to transfer signals from or to the respective nodes, units or devices. The connections may for example be direction connections or indirect connections. Furthermore, the clocks 11,12,20 may, for example, be implemented as an internal clock of a node or as an external clock connected to a node.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the second node 20 may be composed of separate components, e.g. integrated circuits, connected to each other to cooperate as the second node 20.

Also, devices, units or components functionally forming separate devices, units or components may be integrated in a single physical device. For example, in FIG. 2 two separate second node inputs 201,202 are shown for illustrative purposes. However, the second node 20 may have a single physical node input connected to e.g. a network module which separates signals from different first nodes 11, e.g. based on the network address from which the respective signals originate. Also, for example, the clock controller 23 and/or the state controller 24 and/or the memory 25 and/or the mode controller 26 may be implemented as a single integrated circuit.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A data communication network comprising:
    a first sub-network comprising:
        at least two master clocks, and
        a synchronisation system connected to said at least two master clocks,
    comprising an input for receiving clock data representing time base information from said at least two master clocks, wherein said synchronisation system is arranged to determine a common time-base based on said time base information from said at least two master clocks and to control said at least two master clocks based on the determined common time-base; and at least one slave synchronisation data source for generating slave clock synchronisation data derived from said time base information of at least one of said at least two master clocks;

wherein said network includes a second sub-network connected to said first sub-network, said second sub-network including:

at least one slave clock; and a slave clock time-base controller connected to said at least one slave synchronisation data source, for receiving said slave clock synchronisation data and controlling at least one of said at least one slave clock in accordance with the slave clock synchronisation data.

2. A network as claimed in claim 1, wherein said first sub-network includes said at least two master clocks and said slave clock time-base controller is arranged to control said at least one controlled slave clock based on selected clock synchronisation data derived from time information of at least one selected master clock.

3. A network as claimed in claim 2, wherein said synchronisation system is inhibited from using a time-base of said at least one slave clock to determine said common time-base.

4. A network as claimed in claim 2, wherein said slave clock time-base controller is arranged to control said at least one slave clock using first slave clock synchronisation data derived from time information of at least one first master clock and second slave clock synchronisation data derived from time information of at least one second master clock.

5. A network as claimed in claim 2, wherein said slave clock time-base controller is arranged to determine a reliability level of the time-base of the slave clock.

6. A network as claimed in claim 2, wherein said synchronisation system includes at least two nodes, said nodes including each at least one synchronisation unit, which said at least one synchronisation unit is connected to at least one other node for receiving from said other node timing data representing information about a master clock of said other node and determining a common time-base from the received timing data.

7. A network as claimed in claim 1, wherein said synchronisation system is inhibited from using a time-base of said at least one slave clock to determine said common time-base.

8. A network as claimed in claim 7, wherein said slave clock time-base controller is arranged to control said at least one slave clock using first slave clock synchronisation data derived from time information of at least one first master clock and second slave clock synchronisation data derived from time information of at least one second master clock.

9. A network as claimed in claim 1, wherein said slave clock time-base controller is arranged to control said at least one slave clock using first slave clock synchronisation data derived from said time base information of at least one first master clock and second slave clock synchronisation data derived from said time base information of at least one second master clock.

10. A network as claimed in claim 9, wherein said at least one slave clock time-base controller is arranged to compare said first slave clock synchronisation data with said second slave clock synchronisation data.

11. A network as claimed in claim 1, wherein said slave clock time-base controller is arranged to determine a reliability level of the time-base of the at least one slave clock.

12. A network as claimed in claim 11, wherein said at least one slave clock time-base controller is arranged to compare the slave clock synchronisation data with at least one predetermined criterion.

13. A network as claimed in claim 12, wherein said slave clock time-base controller is arranged to control an operational mode of a unit in said second sub-network depending on the determined reliability level, which unit includes at least one of said slave clocks.

14. A network as claimed in claim 11, wherein said slave clock time-base controller is arranged to control an operational mode of a unit in said second sub-network depending on the determined reliability level, which unit includes at least one of said slave clocks.

15. A network as claimed in claim 11, wherein said at least one slave clock synchronisation data source is arranged to repeatedly transmit clock synchronisation data derived from said time base information of at least one master clock and said slave clock time-base controller is arranged to change said reliability level from a current level to a lower level when a predetermined period of time has elapsed after a previous time the slave clock time-base controller received said slave clock synchronisation data.

16. A network as claimed in claim 1, wherein said network is compliant or compatible with at least one standard in the group consisting of: FlexRay, TTCAN, and TTP/C.

17. A network as claimed in claim 1, wherein said synchronisation system includes at least two nodes, said nodes including each at least one synchronisation unit, which said at least one synchronisation unit is connected to at least one other node for receiving from said other node timing data representing information about a master clock of said other node and determining a common time-base from the received timing data.

18. An apparatus provided with a network as claimed in claim 1.

19. A method for controlling a time-base of at least one clock in a network, said method comprising:

receiving clock data representing time base information from said at least two master clocks;

determining a common time-base based on said time base information from said at least two master clocks;

controlling said at least two master clocks based on the determined common time-base;

generating slave clock synchronisation data derived from said time base information of at least one master clock; and receiving said slave clock synchronisation data and controlling at least one slave clock in accordance with the slave clock synchronisation data.

20. A computer program product including program code for performing a method when executed by a programmable apparatus, the method comprising:

receiving clock data representing time base information from said at least two master clocks;

determining a common time-base based on said time base information from said at least two master clocks;

controlling said at least two master clocks based on the determined common time-base;

generating slave clock synchronisation data derived from said time base information of at least one master clock; and receiving said slave clock synchronisation data and controlling at least one slave clock in accordance with the slave clock synchronisation data.

* * * * *